April 28, 1970   L. J. CONRAD ETAL   3,508,646
APPARATUS FOR SEPARATING MEAT AND BONES FROM MIXTURES THEREOF
Filed Sept. 20, 1968   3 Sheets-Sheet 2

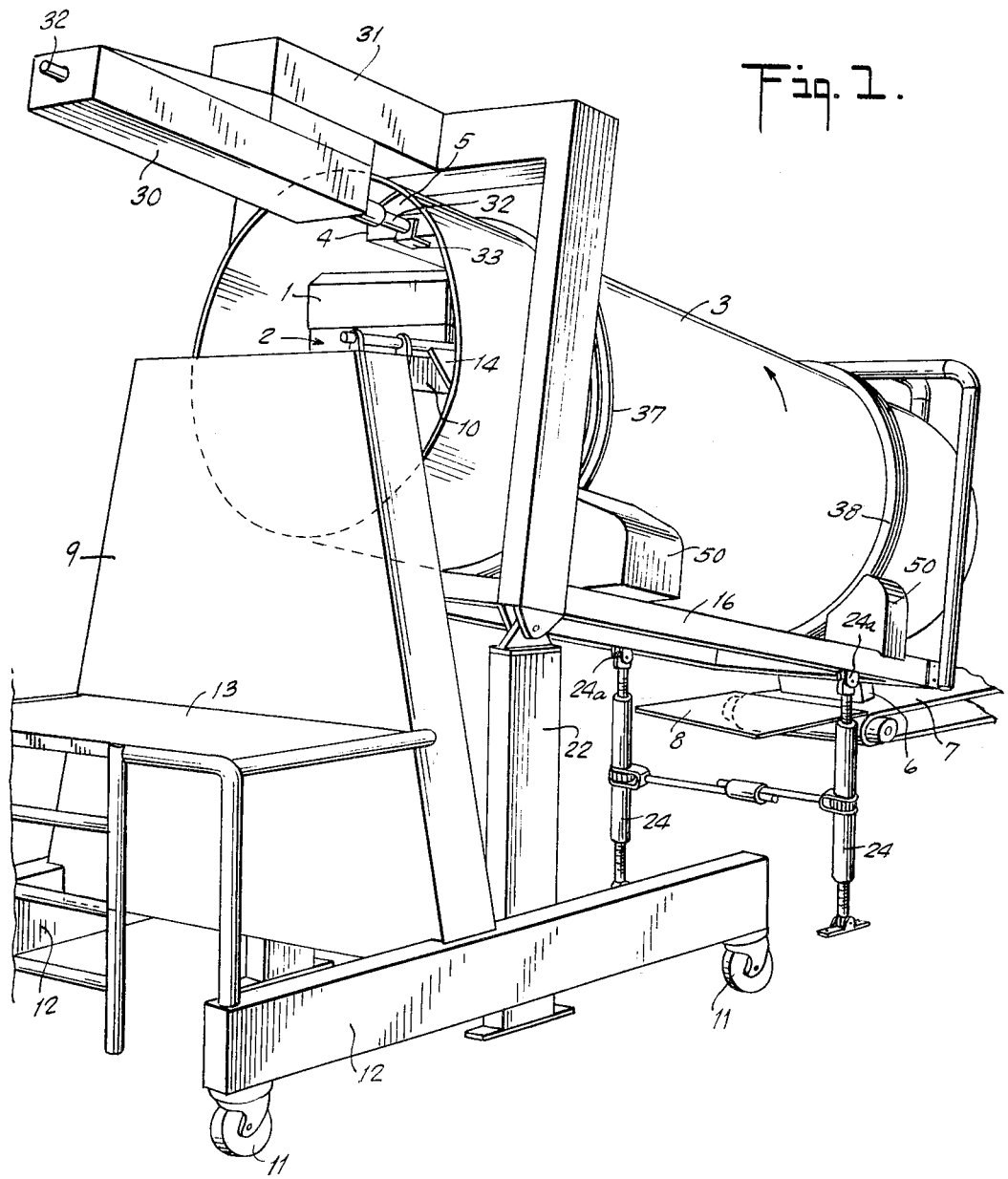

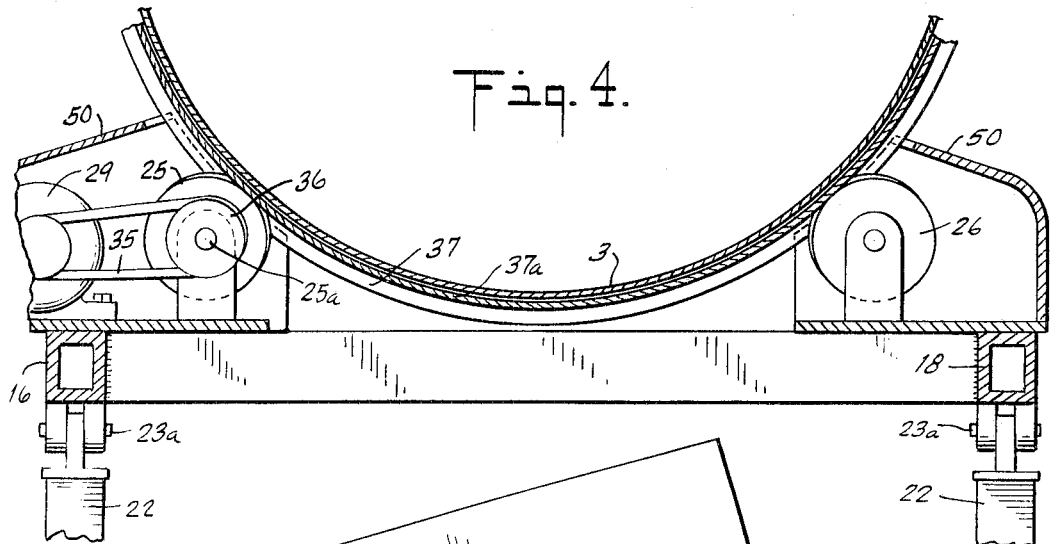
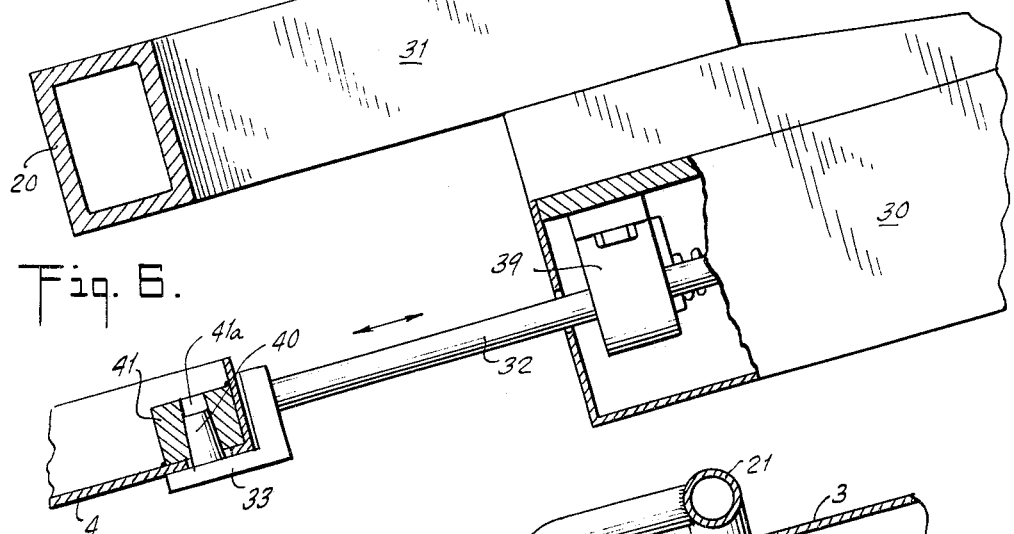
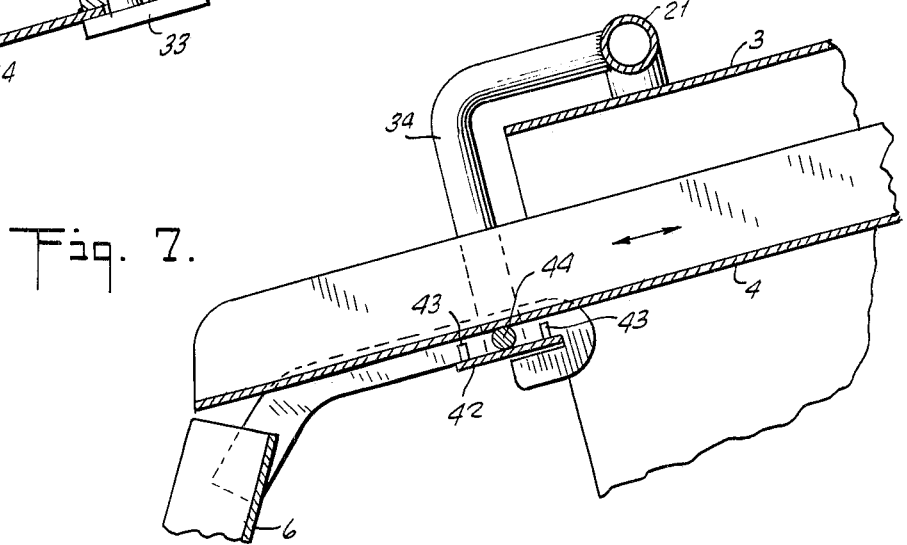

3,508,646
APPARATUS FOR SEPARATING MEAT AND BONES FROM MIXTURES THEREOF

Lucas J. Conrad and John R. Everhart, Winston-Salem, N.C., assignors to R. J. Reynolds Tobacco Company, Winston-Salem, N.C., a corporation of New Jersey
Filed Sept. 20, 1968, Ser. No. 761,179
Int. Cl. B07b 13/00
U.S. Cl. 209—2
3 Claims

ABSTRACT OF THE DISCLOSURE

A food processing apparatus for separating comparatively soft edible material from harder inedible portions in composite foodstuffs comprising a rotating separating drum and a friction conveyor cooperatively mounted on a unitized support frame to permit ready adjustment and held thereon by gravity to facilitate dismantling.

Cross-references

This application is directed to particular features of a food processing system, other features of which are covered in the copending applications of Lucas J. Conrad, Ser. No. 603,484, filed Dec. 21, 1966; Conrad and Alldred, Ser. No. 679,326, filed Oct. 31, 1967; Alldred and Conrad, Ser. No. 679,498, filed Oct. 31,1967, now abandoned in favor of continuation application Ser. No. 824,381, filed May 8, 1969; Conrad and Alldred, Ser. No. 759,709, filed Sept. 13, 1968; Conrad et al., Ser. No. 761,029, filed Sept. 20, 1968; and Lucas J. Conrad, Ser. No. 754,233, filed Aug. 21, 1968; all of which are assigned to the same assignee as the present application.

Background of the invention

The present invention relates to the food processing art and more particularly to an apparatus for separating soft edible material from hard inedible portions in composite foodstuffs.

A number of machines have been developed in the food processing art to mechanically disunite comparatively soft edible material from harder inedible portions in composite foodstuffs. These machines have included hammermills, slicers, graters, and more recently an improved disuniting apparatus comprising a horizontally arranged rotatable disc, having a ribbed surface, with a fixed series of tines mounted above the surface. An apparatus of the latter type is disclosed in the copending application of Conrad et al., Ser. No. 679,326, filed Oct. 31, 1967 and assigned to the same assignee as the present application.

With the improvements in mechanical disuniting means, it has become desirable to develop improved mechanical means for separating the particular components after the disuniting operation. Such separating apparatus must be able to effectively divide an economical proportion of the edible material from the inedible material and must not unduly damage or reduce the edibility of the food during the separating operation. Further, as constant cleanliness is a requirement of the food processing industry, the apparatus must be readily assembled and dismantled to facilitate the frequent washing and maintenance operations.

The apparatus of the present invention is of an improved construction which accordingly permits ready adjustability of the parts for gentle handling of different varities of disunited material during the separating operation and which permits simple and rapid dismantling of the composite machinery facilitating cleaning and washing and significantly reducing shut-down and maintenance time.

Summary of the invention

The invention comprises an improved unitized support frame and mounting means for compositely mounting a rotatable separator drum and reciprocating friction conveyor which act in combination to provide gentle and efficient separation of the disunited softer edible meats from the harder inedible portions. The structural arrangement and combination of the parts permits easy adjustment and cooperation of the separator and conveyor and adapts the apparatus to cooperate with the disuniting means in such manner as to achieve efficient and economical operation. In addition, the separator and conveyor are held on the support structure by virtue of their own weights so as to permit rapid dismantling and reassembly for cleaning and maintenance.

Brief description of the drawings

FIG. 1 is a perspective view of the food processing system incorporating the present invention;

FIG. 4 is a detailed view of the means for mounting the drum to its drive on the support frame;

FIG. 6 is a detailed view of the means for mounting the driven end and drive means of the conveyor; and FIG. 7 is a detailed view of the means for mounting the remote end of the conveyor.

Detailed description

Figure 3:
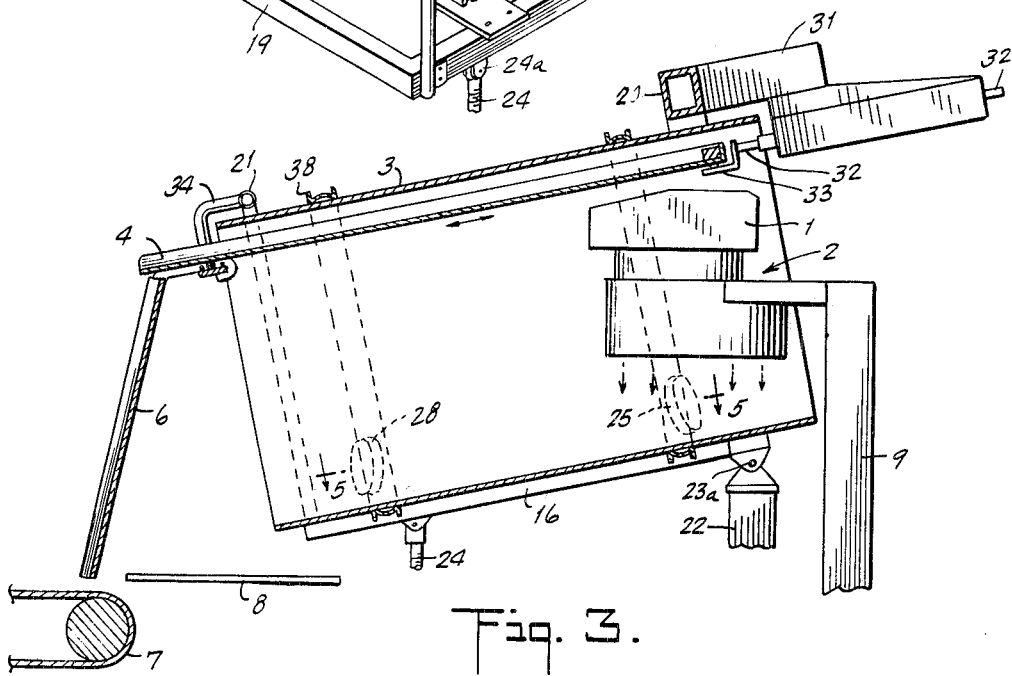
FIG. 3 is a sectional view of the system taken along the axis of the drum.

The food processing system comprising disuniting and separating sections is shown in FIG. 1. The system includes a disuniter mechanism 1 which acts to disunite the edible material from the inedible portions of foodstuffs which are introduced into the mechanism at 2. The disuniter mechanism 1 is positioned in the end of a rotating drum 3 which acts to separate the edible material from the inedible material dropping from the bottom of the disuniter mechanism 1 (FIG. 3). The drum 3 separates the components by transporting the edible material which sticks to its surface upwardly while the inedible material slides to the bottom of the drum 3. A reciprocating adhesive friction conveyor 4 located near the top of the drum 3 receives the edible material carried upward on the drum surface. The edible material is scraped by element 5 from the drum surface and dropped by gravity onto the conveyor surface, and is transferred by the conveyor 4 to the chute 6 and conveyor 7 for further processing. Another conveyor 8 receives the inedible material dropping from the lower part of the drum 3 and removes it for further processing or disposal.

The disuniter mechanism 1 is mounted on a suitable carriage 9 by a cantilevered support 10 to facilitate its positioning in one end of the separator drum 3. The carriage 9 is provided with castered wheels 11 on its support beams 12 so that the disuniter mechanism 1 may be readily inserted in or removed from the end of the drum 3 by simply rolling the carriage 9 along the floor. The carriage 9 is also provided with a platform 13 on which an operator stands to introduce the foodstuffs to be processed into the disuniter 1. A mechanical means may alternatively be used to accomplish the feeding. A scraper element 14 is mounted on the top of the carriage 9 and extends with the disuniter 1 into the end of the drum 3 to prevent any of the disunited foodstuffs, dropping from the bottom of the disuniter mechanism 1, from being carried by the drum surface onto the top of the disuniter mechanism. The disuniter mechanism 1 and its mounting are described in greater detail in the previously cited copending application of Conrad and Alldred, Ser. No. 759,709.

Support frame

Figure 2:
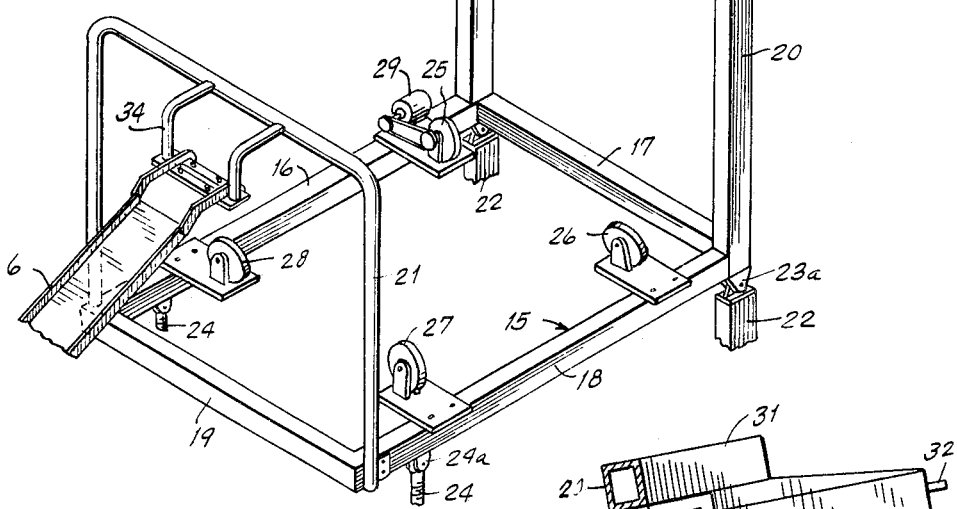
FIG. 2 is a perspective view of the improved support frame with the disuniter, separator drum and friction conveyor removed.

The mounting for the separating section of the apparatus is the subject of the present invention. As best seen in FIG. 2, the mounting comprises an adjustable support frame consisting of a rectangular bed 15 formed by four beams 16, 17, 18 and 19 to which upstanding members 20 and 21 are attached at either end. The upstanding members 20 and 21 may be in the form of inverted U-frames or similar support structures. The bed 15 is supported at one end by two upright columns 22, which have the two arms of the inverted U-frame 20 pinned by pins 23a to their upper ends. The beams 16, 17 and 18 of the bed 15 are welded or otherwise fastened at the lower ends of the arms of U-frame 20 so that the bed 15 moves with the U-frame 20 when the latter is rotated on the pins 23a. The beam 19 is similarly fastened to beams 16 and 18 at the opposite end of the bed 15 and the arms of the U-frame 21 are bolted or otherwise fastened to the bed 15 at this end so that the entire structure moves as a unit. The opposite end of the bed 15 is supported by two screw jacks 24 or similar means whose length may be readily varied. The jacks 24 are attached to the bed by means of pins 24a and the length of the screw jacks can be adjusted to accommodate rotation of the bed 15 about the pins 23a. Thus the bed 15 may be tilted with respect to the horizontal through a considerably large angle.

Support rollers 25, 26, 27, and 28 for the separator drum 3 are mounted on the upper surface of beams 16 and 18 of the bed 15. One of the rollers, such as 25, is driven by a suitable motor 29 also mounted on the bed 15. This drive system which rotates the drum 3 will be more fully described hereinafter. Protective covers 50 may be provided over the rollers.

A drive means for the friction conveyor 4 is contained in a housing 30 mounted on the upper part of the U-frame 20. The support for the housing 30 consists of an arm 31, extending from the cross bar of the frame 20, which arm has means for supporting the conveyor drive shaft 32. The end of the conveyor 4 is attached to the drive shaft 32 by a bracket 33 as will be more fully described hereinafter. The opposite end of the conveyor 4 is supported on the other U-shaped structure 21 by a bracket 34 thereon which supports the end of the conveyor 4 and the chute 6.

Upon considering the support frame as described thus far, it will be seen that when the angle of tilt of the separator drum 3 is varied by adjusting the length of the screw jacks 24, the tilt angle of the conveyor 4 will vary accordingly, since the supports 29 and 21 at its opposite ends are fixed with respect to the drum support structure. Thus when the composite structure is dismantled for cleaning and then reassembled, the number of adjustments required to reorient the entire structure will be minimized and in fact the tilt angle of the composite separator structure may be varied by adjusting the length of the screw jacks 24.

Drum drive and support

Figure 5:
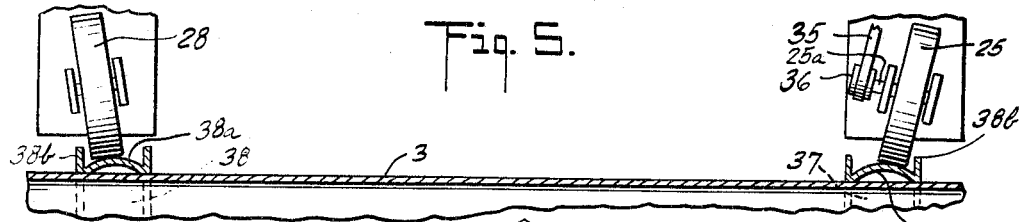
FIG. 5 is a detailed view of the engagement of the drum support rollers with the tracks on the drum.

The means for rotatably mounting and driving the separator drum 3 on the support frame 15 is shown in greater detail in FIGS. 4 and 5. The drive means consists of the motor 29 which rotates roller 25 through belt 35 which drives sheave 36 connected to the roller axle 25a. The roller 25 rides in a channel-like circumferential track 37 on the outer surface of the drum 3. The driving force is imparted to the drum 3 through the frictional engagement of the outer edge of roller 25 with the web 37a of the channel-like track 37. A similar track 38 is provided toward the opposite end of the drum and the entire drum support is provided by the rollers 25 and 26, and 27 and 28, respectively riding in the tracks 37 and 38.

As the drum 3 is normally tilted with respect to the horizontal during operation, a thrust bearing would ordinarily have to be provided in the support means to prevent the drum 3 from sliding downwardly off the tilted support frame. However, to obviate the need for an extra bearing, the support rollers are mounted at an angle with respect to the tracks so that rollers 25 and 28, and rollers 26 and 27, cooperate to provide a toed-in support arrangement as shown in FIG. 5. The axis of rotation of roller 25 is disposed at an angle with respect to the surface of the drum 3 and engages the web 37a of track 37 at one side. It is important to note that when the channel-like tracks are wrapped around the drum, their webs have a tendency to wrap into a convex shape with respect to the upstanding sides. This convex configuration of the web permits the angularly arranged roller to engage the web on one side of its arc without contacting the adjacent upstanding side of the track. Thus, the rollers 25 and 28, and the rollers 26 and 27 may be disposed at an angle to each other so as to ride on the webs 37a and 38a of tracks 37 and 38 to one side without frictionally engaging the upstanding sides 37b and 38b. The lowermost rollers 27 and 28 then act as thrust bearings and cooperate with the upper rollers 25 and 26 in supporting the drum. It will be seen that the drum may be removed from the apparatus for cleaning by merely lifting it off the rollers so that no special tools or other dismantling operations are required.

Conveyor support

The mounting arrangement for the friction conveyor is shown in greater detail in FIGS. 6 and 7. The drive means for the conveyor is mounted within the housing 30 which is supported by arm 31 on the U-frame 20. The drive means is disclosed in greater detail in the previously cited copending application of Conrad et al., Ser. No. 761,029, and has a reciprocating drive shaft 32 which extends through both ends of the housing 30. The drive shaft 32 is slidably supported in two bearings, such as 39, located within the housing 30 and attached to the support arm 31. One end of the drive shaft 32 is provided with a bracket 33 having an upstanding pin 40 located thereon. The end of the conveyor 4 is provided with a fitting 41 having an opening therein which receives the upstanding pin 40 to operatively connect the drive shaft 32 with the conveyor 4. The weight of the conveyor 4 maintains the connection between the pin 40 and the fitting 41 during the reciprocating operation.

The opposite end of the conveyor 4 is supported on a crossbar 42 of the bracket 34 on frame 21. The crossbar 42 has four upstanding pins or stops 43 on its flat upper surface which confine the movement of a roller 44 riding on the surface. The underside of the conveyor 4 rests on the roller 44 frictionally engaging the roller surface. As the conveyor is driven in reciprocating motion, the roller 44 will be driven through the frictional engagement with the conveyor undersurface back and forth between the stopping pins 43 and thus provides a low friction bearing support for the remote end of the conveyor 4.

The only attachment of the conveyor 4 to its supporting apparatus is located at its driven end and is maintained by the weight of the conveyor 4. To remove the conveyor 4 from the support apparatus, it is therefore necessary merely to lift the driven end of the conveyor releasing the engagement between pin 40 and fitting 41 eliminating the need for any special tools or other dismantling operations.

It will thus be seen that a food processing apparatus is provided which is of comparatively simple construction and which greatly facilitates the separating of edible material from inedible portions of composite foodstuffs. The separating and conveying means are cooperatively mounted on a support structure and the entire apparatus may be operatively adjusted by merely varying the length of two screw jacks. The separating drum and conveyor may be removed from the apparatus for cleaning by merely lifting them off their support means without the use of any special tools or other dismantling operations. In addition the support bearings are arranged to minimize frictional losses in the apparatus so that shut-down time of the machinery for maintenance and cleaning is reduced to a minimum.

What is claimed is:

1. An apparatus comprising:
    (a) a rotatable drum;
    (b) means mounting said drum for tilting about a transverse axis;
    (c) rollers on said mounting means supporting said drum for rotation about its longitudinal axis, at least two of said rollers being longitudinally aligned and spaced on the surface of said drum and inwardly toed with respect to each other; and
    (d) two circumferential channel-like members spaced on the surface of said drum and having their webs convex with respect to their sides said webs being engaged on one side by said rollers.

2. A separating apparatus for sorting a mixture of foodstuffs by means of the differing coefficients of adhesive friction of the components comprising:
    (a) a rotating drum whose inner surface separates the components in the mixture of foodstuffs in accordance with the inherent adhesive friction properties of the components, the more adhesive components adhering to said inner surface;
    (b) a reciprocating conveyor positioned in said drum for receiving the more adhesive components of said separating material which adhere to the surface of the drum and for transporting said components out of the drum;
    (c) means cooperatively mounting said drum and said conveyor for tilting about a transverse axis;
    (d) rollers on said mounting means rotatably supporting said drum;
    (e) two circumferential channel-like tracks axially spaced on the surface of said drum and having their webs convex with respect to their sides;
    (f) at least two of said rollers longitudinally aligned and arranged at an angle to respectively engage said webs on one side providing inwardly toed support for said drum.

3. A separating apparatus for sorting a mixture of foodstuffs by means of the differing coefficients of adhesive friction of the components comprising:
    (a) a rotating drum whose inner surface separates the components in the mixture of foodstuffs in accordance with the inherent adhesive friction properties of the components, the more adhesive components adhering to said inner surface;
    (b) a conveyor positioned in said drum for receiving the more adhesive components of said separating material which adhere to the surface of the drum and for transporting said components out of the drum;
    (c) means cooperatively mounting said drum and said conveyor;
    (d) means on said mounting means for driving said conveyor imparting reciprocatory motion thereto;
    (e) an upstanding pin on said conveyor driving means;
    (f) means on one end of said conveyor defining an aperture for accommodating and engaging said pin;
    (g) a bracket on said mounting means;
    (h) stop means spaced on the upper surface of said bracket;
    (i) a roller riding on the upper surface of said bracket between said stop means and frictionally engaging the under surface of the conveyor near the end remote from said aperture;
    (j) the structure of subparagraphs (e) through (i) cooperating to permit said conveyor to be disengaged from said mounting and driving means solely by lifting.

References Cited

UNITED STATES PATENTS

| | | | |
|---|---|---|---|
| 615,519 | 12/1898 | Barr | 308—203 X |
| 758,438 | 4/1904 | Graupner | 209—452 |
| 974,964 | 11/1910 | Helbig | 308—204 |
| 1,458,467 | 6/1923 | Dolbear | 209—47 |
| 1,581,240 | 4/1926 | Stebbins | 209—152 |
| 1,964,733 | 7/1934 | Homan | 209—479 |
| 2,018,010 | 10/1935 | Chance | 209—471 |
| 2,305,568 | 12/1942 | Brent | 209—437 |
| 2,608,299 | 8/1952 | Huelsdonk | 209—452 X |
| 2,674,445 | 4/1954 | Diehl | 308—203 X |
| 3,042,208 | 7/1962 | Holmes | 209—452 X |

FRANK W. LUTTER, Primary Examiner

U.S. Cl. X.R.

209—45, 452; 308—204